(12) United States Patent
Gurov

(10) Patent No.: US 6,590,786 B2
(45) Date of Patent: Jul. 8, 2003

(54) SYSTEM FOR CONTROLLING THE DELIVERY OF POWER TO DC COMPUTER COMPONENTS UTILIZING PHASE SHIFT REGULATION

(75) Inventor: Gennady G. Gurov, Fort Collins, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 0 days.

(21) Appl. No.: 09/922,629

(22) Filed: Aug. 7, 2001

(65) Prior Publication Data

US 2003/0031033 A1 Feb. 13, 2003

(51) Int. Cl.[7] .............................................. H02M 3/335
(52) U.S. Cl. ..................... 363/16; 363/21.06; 363/21.14
(58) Field of Search ................................. 363/16, 21.01, 363/21.06, 21.14, 21.09, 84, 89, 125, 127

(56) References Cited

U.S. PATENT DOCUMENTS 5,742,491 A  *  4/1998  Bowman et al. ......... 363/21.06

6,252,781 B1  *  6/2001  Rinne ........................ 363/16
6,418,039 B2  *  7/2002  Lentini .................... 363/21.09

* cited by examiner

Primary Examiner—Jessica Han
(74) Attorney, Agent, or Firm—Benjamin Hudson, Jr.

(57) ABSTRACT

There is provided by this invention novel and unique circuit topology for controlling the delivery of power to dc components that is generally comprised of a combination of a free running unregulated AC generator with a synchronous rectifier working at the same switching frequency as the AC generator. The AC generator operates in zero-voltage switching mode, and the synchronous rectifier operates in both zero-voltage and zero-current modes which allows the use of frequency conversion rates up to 10 MHz. Changing the phase of commutation of the synchronous rectifier in reference to that of the AC generator controls the output power. Resonant sinusoidal and pulse gate drivers are used for both the AC generator and the synchronous rectifier. A low loss current combiner is used at the output of the system.

32 Claims, 12 Drawing Sheets

SYSTEM FOR CONTROLLING THE DELIVERY OF POWER TO DC COMPUTER COMPONENTS UTILIZING PHASE SHIFT REGULATION

BACKGROUND OF THE INVENTION

1. Field of the Invention

This invention relates generally to systems for powering low voltage high current electronics, and more particularly to, systems for powering low voltage high current electronic loads such as computer components.

2. Brief Description of the Prior Art

In prior art topologies for powering low voltage high current electronic loads low frequency techniques, generally 200–300 kHz, are used. To meet substantial changes in load demands a large output capacitance is becoming required. The cost of the capacitors becomes a substantial part of the power source cost and the location of these large capacitors close to the point of the load, which is usually the microprocessor, becomes difficult.

Some designers have attempted to solve these problems with switch mode power supplies that use phase shift regulation on the generator side of the power supply that transforms the energy of the primary DC source into AC energy. In other words phase shift regulation is used to control amount of energy generated by DC-to-AC inverter according the output load requirement. If the load requires it this AC energy can be transformed further into DC energy with help of the rectifier. In such a traditional architectures the rectifier plays a passive role and only transforms AC energy into DC without any regulation. The regulation capabilities of prior art topologies utilized in dc-dc converters are based upon controlling the amplitude of the sinusoidal AC voltage going to the input of the synchronous rectifier. Such a system is disclosed in U.S. Pat. No. 6,178,098 issued to Jen He et al. This patent teaches utilizing a feedback of a phase-shifted waveform to regulate the inverter of the power converter. A switching circuit phase shifts the waveform to increase or decrease the output of the inverter voltage into the rectifier of the dc converter. At the same time all prior art topologies using phase shift regulation operate at low frequency, generally 200–300 kHz, so they still require a large output capacitance.

A more advanced approach to providing a dc power conversion system which is both lower in cost than traditional topologies and performs a conversion from medium voltage dc to low voltage high current dc at the point of power consumption with high efficiency and fast regulation response is disclosed in the Co-pending Application Ser. No. 09/641,584 entitled, "Multiple Power Converter System Using Combining Transformers" assigned to the assignee of the instant application and incorporated herein by reference. This application discloses a plurality of power converters combined with coupled inductors, so arranged that the group of converters act together to produce a combined output that exhibits low voltage high current and fast regulation response. In other Co-pending Applications Ser. No. 09/534,641 entitled "High Frequency Switch-mode DC Powered Computer System and Ser. No. 09/584,412 entitled "System for Controlling the Delivery of Power to DC Computer Components" both assigned to the assignee of the instant application and incorporated herein by reference, voltage regulation modules convert the sinusoidal power to low voltage high current power for computer loads in the first application and in the latter a high current secondary of a transformer located physically close to the load eliminates large currents being distributed to the converter input. As advanced as these designs are over traditional power converter topologies they too are based on controlling the amplitude of the sinusoidal AC voltage going into the synchronous rectifier.

It would be desirable if there were provided a system for powering electronics or computer components that were low in cost, small in size, had fast transient response, and provided a wide range of output voltages and currents.

SUMMARY OF THE INVENTION

There is provided by this invention a dc-dc power converter that functions in two stages. The first stage is a free running unregulated AC generator with either a sinusoidal or trapezoidal output voltage. The second stage is a synchronous rectifier working at the same switching frequency as the AC generator. The AC generator operates in zero-voltage switching mode, and the synchronous rectifier operates in both zero-voltage and zero-current modes which allows the use of frequency conversion rates up to 10 MHz. Changing the phase of commutation of the synchronous rectifier in reference to that of the AC generator controls the output power. Resonant sinusoidal and pulse gate drivers are used for both the AC generator and the synchronous rectifier. A low loss current combiner is used at the output of the system.

BRIEF DESCRIPTION OF THE PREFERRED EMBODIMENT

Figure 1:
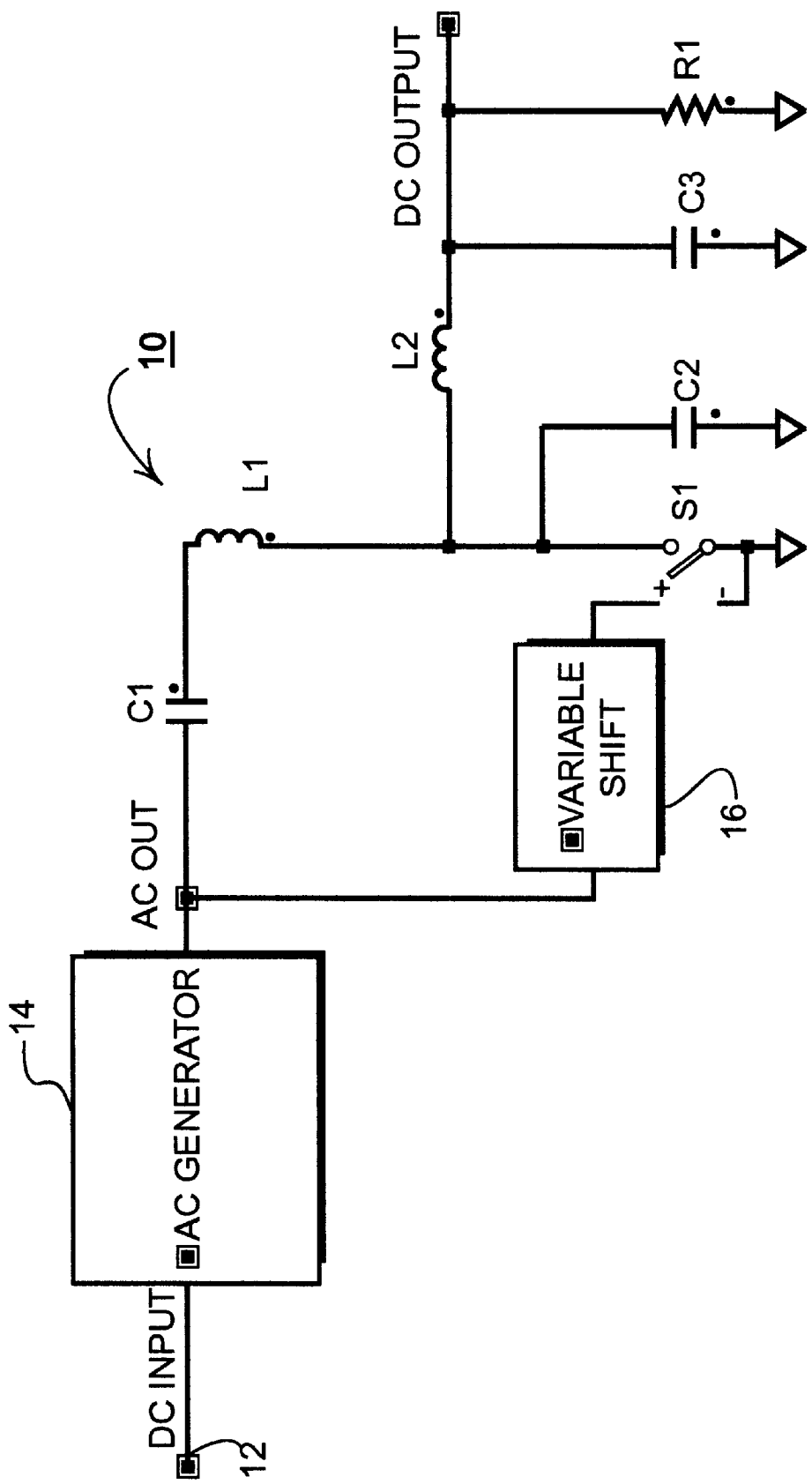
FIG. 1 illustrates a single-phase asymmetrical topology of a dc-dc converter incorporating the principles of this invention.

Referring to FIG. 1 there is shown a block diagram of a single-phase asymmetrical dc-dc converter 10 incorporating the principles of this invention. A dc input voltage 12 is applied to an AC generator 14. The AC generator 14 may be an inverter that converts dc input power into an ac output at some predetermined frequency as well known to those skilled in the art and may be comprised of a variety of topologies. In the preferred embodiment the AC generator 14 produces a high conversion frequency voltage. AC sinusoidal, trapezoidal, or square wave voltages may be used for operation. The trapezoidal voltage generator is preferred because it is simpler and the variation of the output voltage of the generator is less sensitive to any load changes. The AC generator 14 is free running, that is, it has no feedback for voltage regulation. An inductor L1 is an energy storage element that is connected in series to a blocking capacitor C1 that prevents DC current from passing through the inductor L1 and the generator 14. S1 is a switching element of the synchronous rectifier. The output voltage of the AC generator 14 through a variable phase shifter 16 controls the on-off state of S1. The variable phase shifter may be a variable time delay circuit well known to those skilled in the art the function of which will be explained hereinafter. The capacitor C2 maintains a soft switch mode for the synchronous rectifier and can include the intrinsic capacitance of the switch S1. The inductor L2 and capacitor C3 are the output filtering elements for the load R1.

Figure 2:
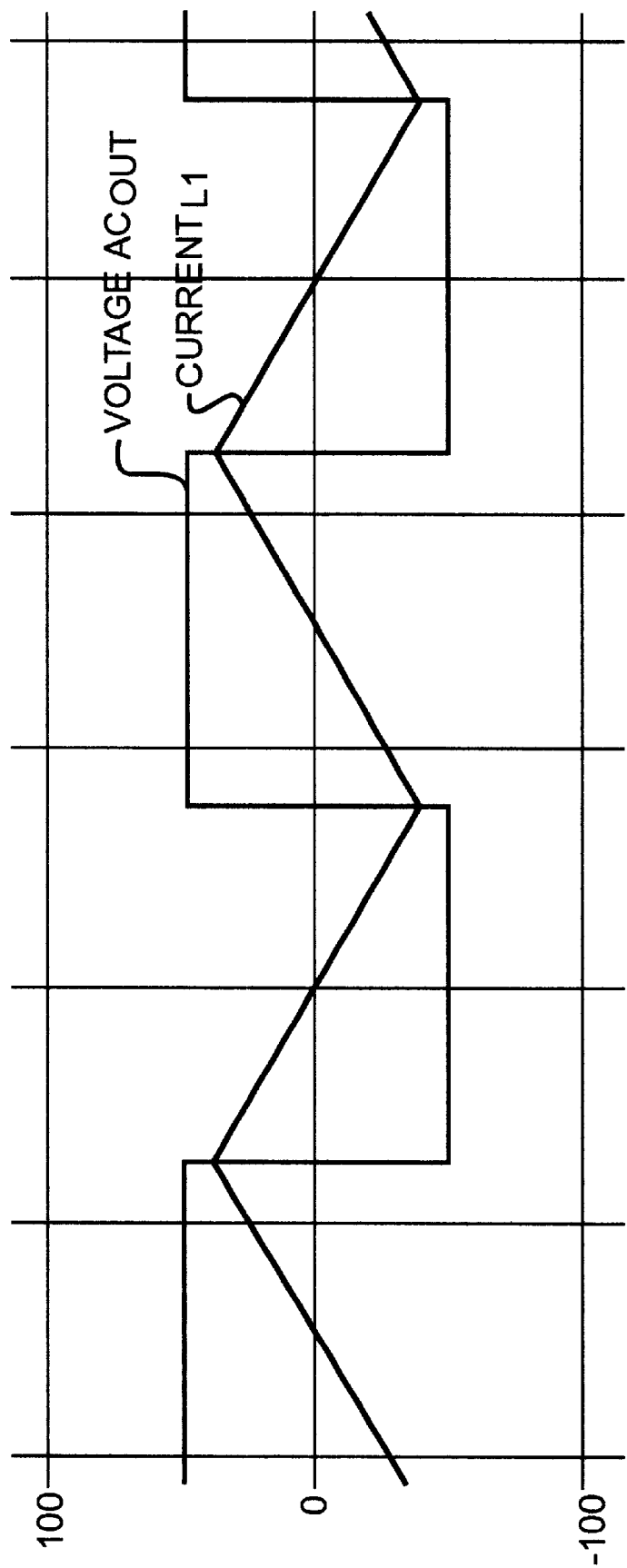
FIG. 2 illustrates the AC output voltage of the AC generator and the current generated through the energy storage inductor.

Referring to FIG. 2, if the AC generator output voltage is trapezoidal and the switch S1 is in the ON-state all the time the trapezoidal voltage will create a triangular shape alternate current through the inductor L1. This means that at any given moment of time the inductor L1 has certain stored energy and the amount of that energy depends on the time or phase distance from the front of the voltage pulse to the point of measurement. As long as S1 stays in the ON-state, the theoretical periodical loss less energy exchange process between L1 and the AC generator 14 takes place. If the current flow through L1 is interrupted then it becomes possible to extract part or all of the stored energy from L1 into some external circuit. If the duration of that interruption process is much shorter than the period of the AC voltage, then the amount of extracted energy becomes proportional to the interruption process phase position in reference to the phase of the AC generator voltage. The switch S1 plays the role of the interrupter. The process of switching S1 is synchronized with the AC generator 14 through the variable phase shifter 16.

Figure 3:
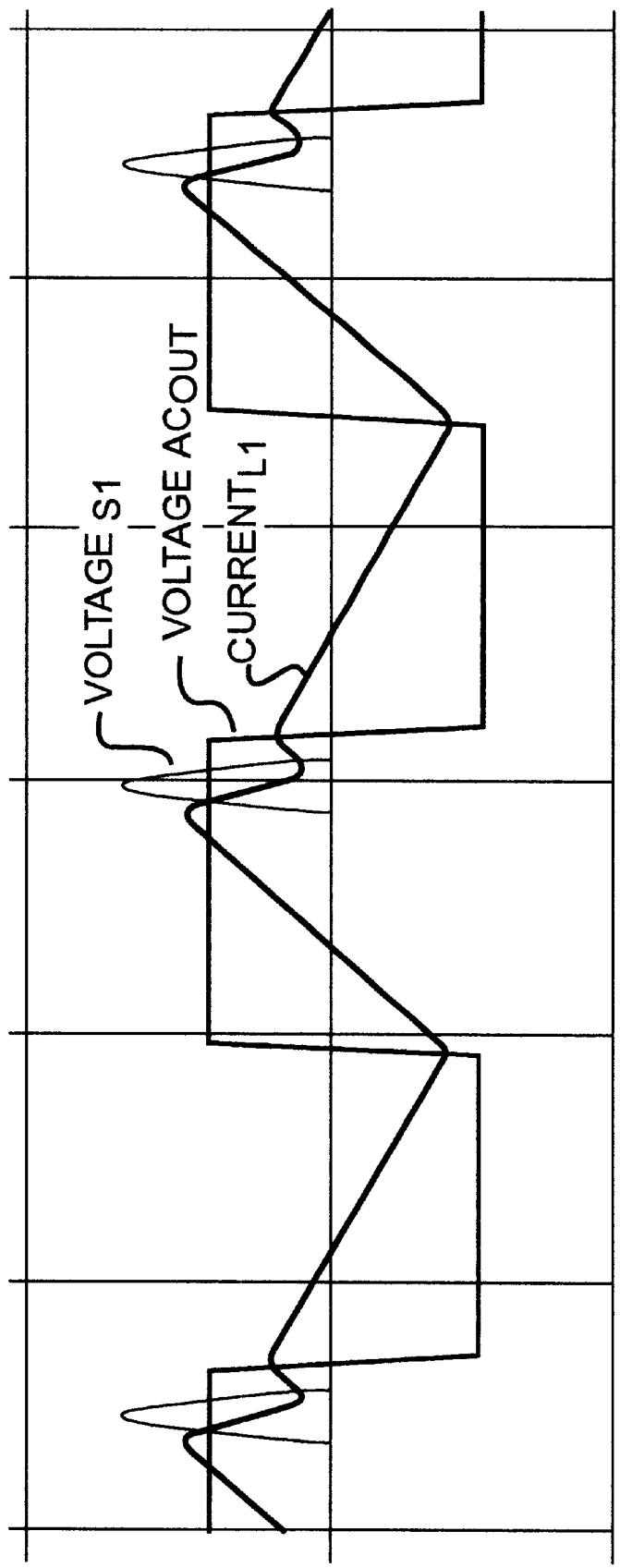
FIG. 3 illustrates the AC output generator voltage, the current generated through the energy storage inductor, and the voltage across the switching element of the synchronous rectifier of the dc-dc converter of FIG. 1 in the operational mode with a high dc load current.

Referring to FIG. 3, the current and voltage waveforms illustrate the operational mode of the inverter shown in FIG. 1. This mode of operation is for the condition where the inverter is connected to a high current dc load. Switch S1 is turned OFF periodically for a short period of time during the positive part of the trapezoidal ac voltage from the ac generator 14. During the negative part of the ac voltage, the current through L1 has the same character as shown in FIG. 3 because S1 is in the ON-state. S1 is turned off when the current through L1 is close to the maximum value. Immediately after S1 turns OFF the sinusoidal oscillating process in the resonance circuit formed by elements C1, L1, C2, L2, and C3 starts to develop. Values of all the resonant elements and the OFF time of S1 are chosen such that only one half of the sinusoidal waveform for S1 is formed. Switching of S1 in the zero voltage mode from ON-state to the OFF-state and back takes place when voltage across S1 is near zero so commutation losses are brought to minimum value. During the OFF-state of S1 the part of energy stored in L1 is transferred into the load R1 through the output filter L2 and C3. In FIG. 3 it is seen that current in L1 has dropped about 4 times when S1 was OFF and the voltage pulse across S1 is formed which means that about 94% of stored energy has been pumped out from L1 into the load R1. Output voltage at the load R1 is equal to the mean value of the pulse voltage across the switch S1.

Figure 4:
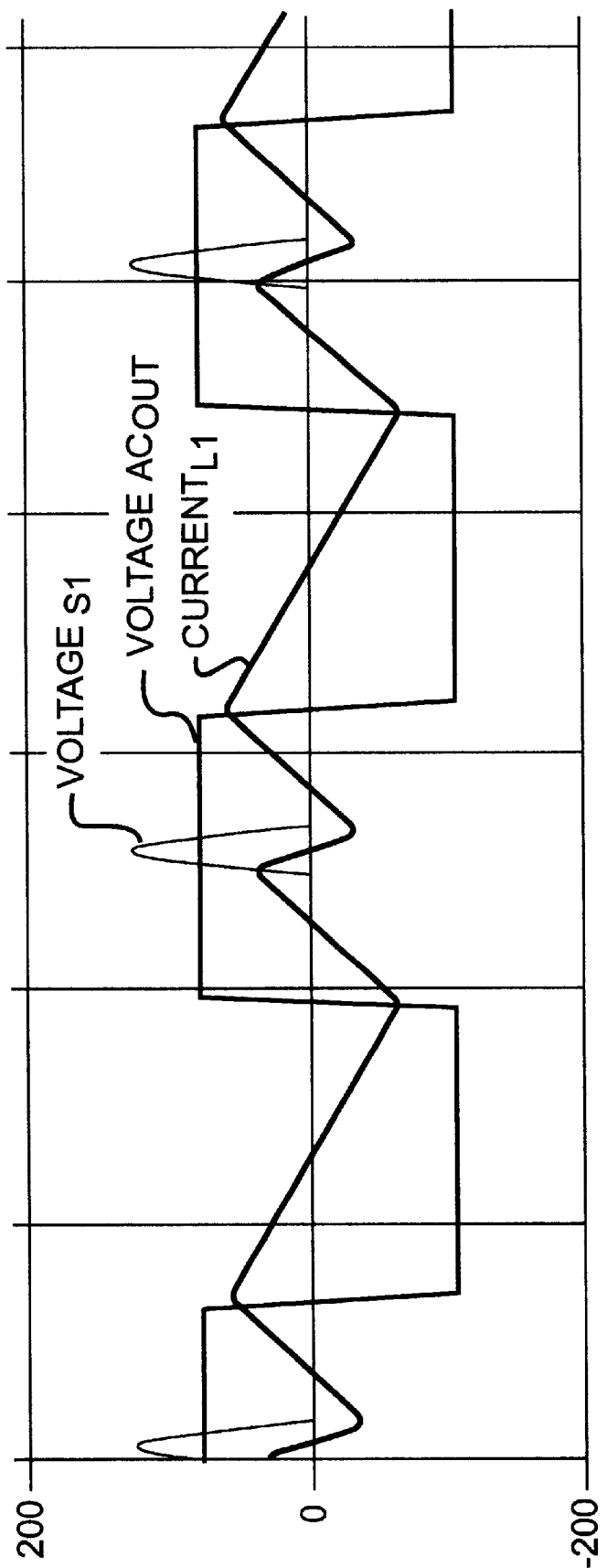
FIG. 4 illustrates the AC output generator voltage, the current generated through the energy storage inductor, and the voltage across the switching element of the synchronous rectifier of the dc-dc converter of FIG. 1 in the operational mode with a low dc load current.

FIG. 4 shows the operating mode of the inverter of FIG. 1, but for the condition where the converter is connected to a low current DC load. It operates when a low rate of energy is transferred from inductor L1 into the load R1. This means that S1 has to be turned OFF when the amplitude of the current through L1 (i.e. stored energy) is close to zero. The change in the DC load requires a change in the phase shift between AC voltage and switching of S1. FIG. 4 shows the position of the half-sinusoidal pulse across S1 for this mode, corresponding to the low current DC load. Now the pulse is close to the center of the positive part of the AC voltage. The amplitude of the voltage across S1 is the same as in FIG. 3 so the voltage at the load R1 is the same as well.

As it was mentioned above the pulse width across S1 for zero voltage switching is defined by values of C1, L1, C2, L2 and C3 and does not depend of the current in the load and output voltage. As described the topology of the converter shown in FIG. 1 actually functions as a "Power Transformer" rather then Voltage or Current Transformer. It means that this topology can be used for wide voltage range power supplies.

Figure 5:
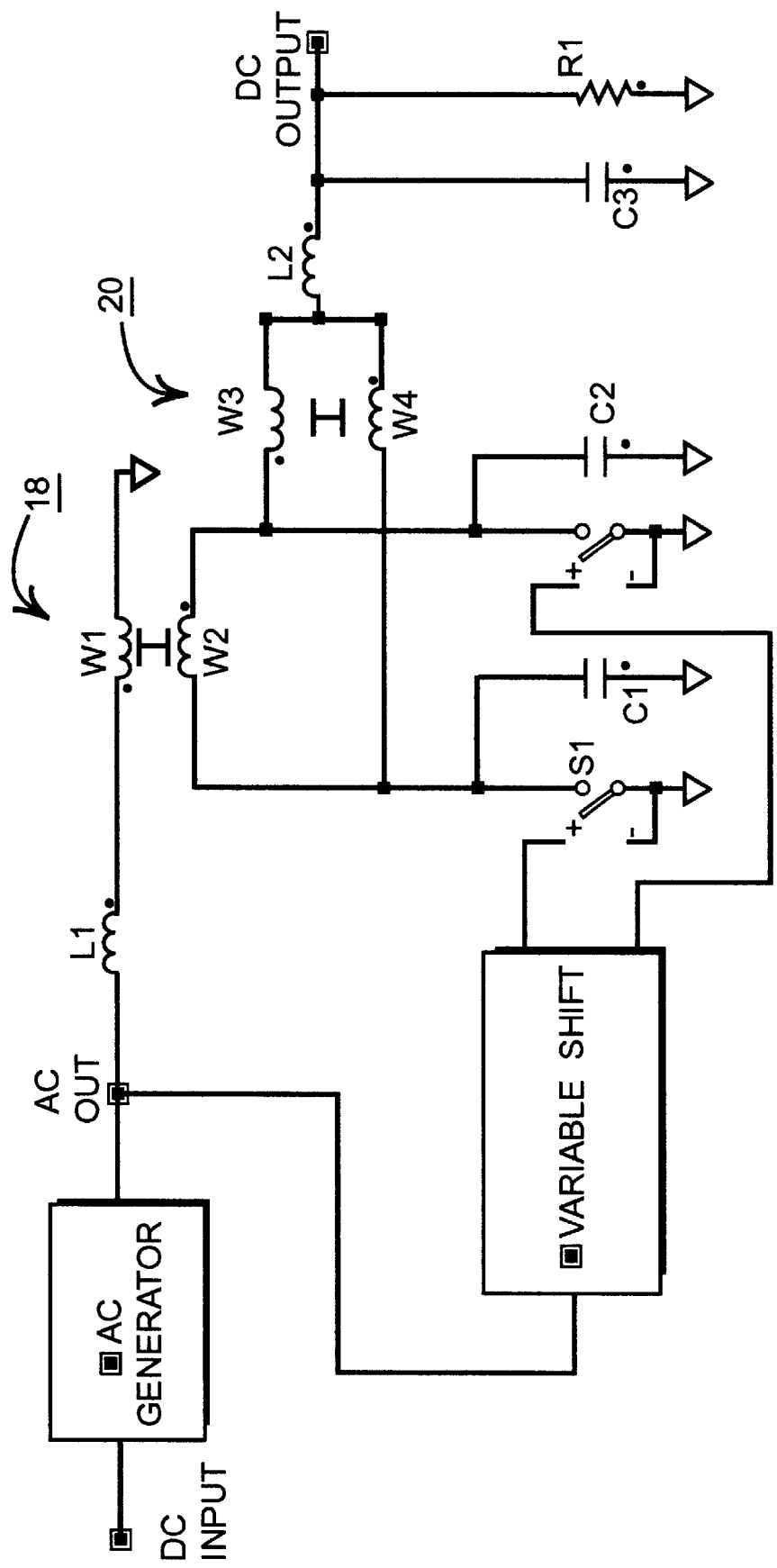
FIG. 5 illustrates a two-phase symmetrical topology of a dc-dc converter incorporating the principles of this invention.

FIG. 5 shows a two-phase configuration of the converter that incorporates the principles of this invention of the same principal as described above. One feature of this configuration is the use of a transformer 18 between AC generator and synchronous rectifier for isolation the primary side of the converter from the secondary and better matching of input and output voltages. The leakage inductance of the transformer can be part of the energy storage inductance L1 or even be the only storage inductance. Another feature in this two phase configuration is the use of both positive and negative halves of AC voltage. A current combiner 20 is added to the output of the synchronous rectifier.

Figure 6:
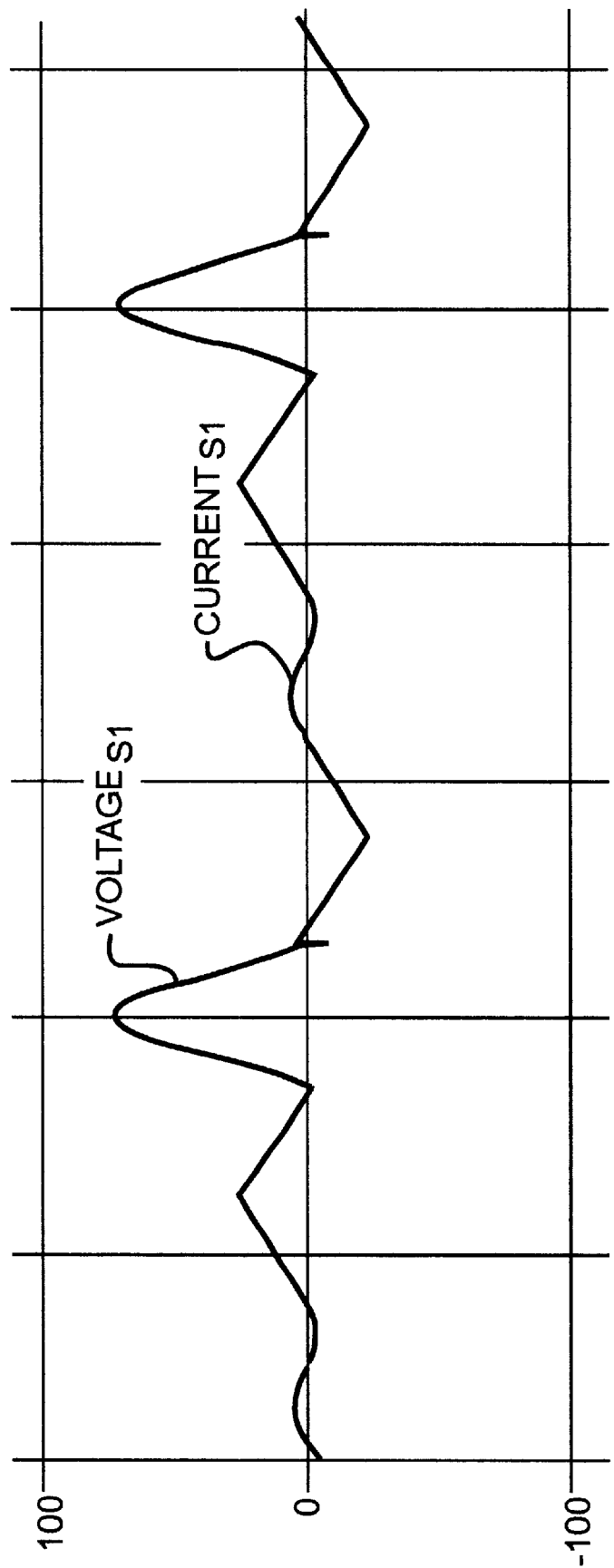
FIG. 6 illustrates the zero voltage and zero current switching waveforms for the switching element of the synchronous rectifier of the dc-dc converter of FIG. 2 for low output load current.
Figure 7:
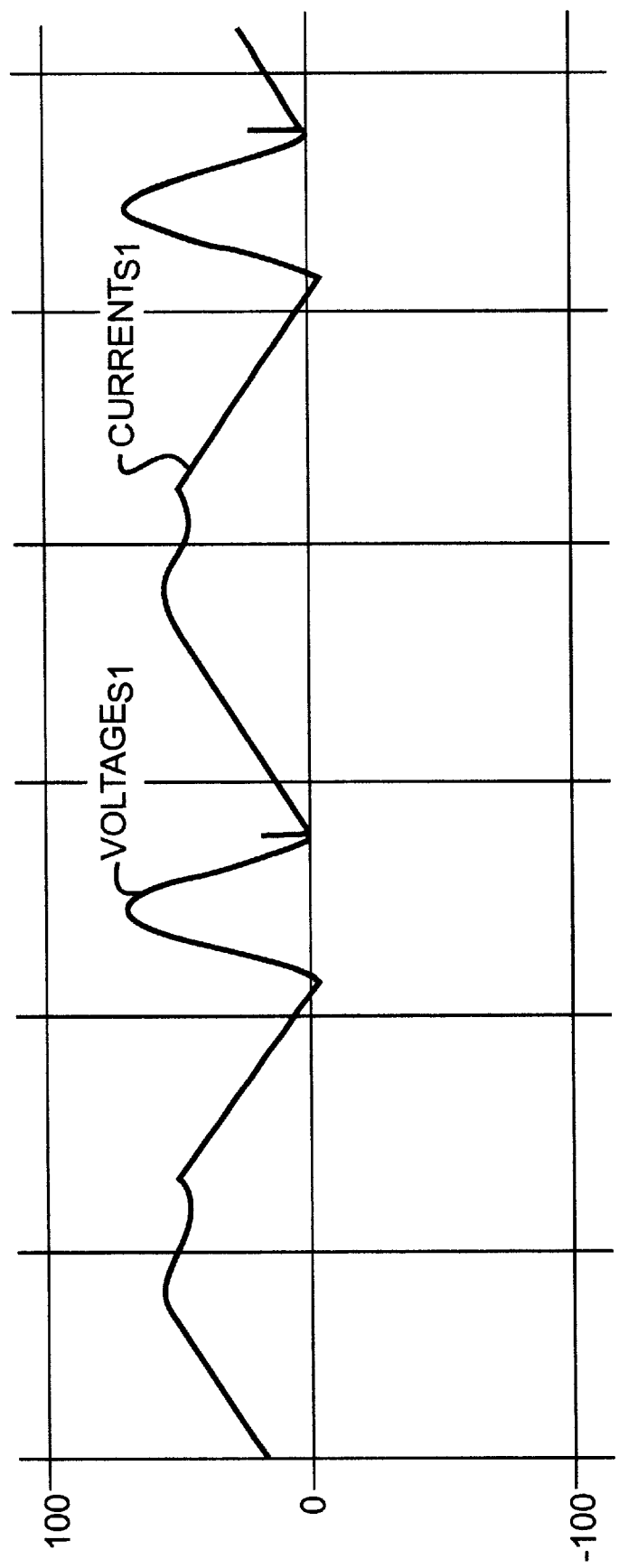
FIG. 7 illustrates the zero voltage and zero current switching waveforms for the switching element of the synchronous rectifier of the dc-dc converter of FIG. 2 for high output load current.

The topology that utilizes the transformer 18 turns ratio, its leakage inductance, the natural or additional capacitances of the synchronous rectifier switching devices, and the current combiner configuration gives the converter several of the following advantages:

1) The converter has a wide range of the output voltages. For example, the output voltage range was is 1V to 2V with efficiency comparable with that for the standard buck converter in the same range of output currents.
2) The absence of resonant elements in the feedback loop improves transient response and allows a decrease in the value of the output filtering capacitor. For example, for a 1.5 V 100 A power supply the output capacitor value of 300uF is enough to keep the output voltage variation within 3% for 25% output current step.
3) The Zero Voltage and Zero Current switching conditions for the synchronous rectifier can be maintained over the whole regulation range of output voltages and currents. FIG. 6 shows the voltage and current waveforms through S1 when the load R1 draws low output current and FIG. 7 shows the waveforms for high output load currents for the two-phase configuration.

4) Simple and effective square or trapezoidal wave shape generators can be used as a primary power source.

5) The reactive part of the input impedance of the synchronous rectifier can be made constant under different load conditions. In case of using the switch mode AC generator as a primary power source, the synchronous rectifier input impedance may be brought to the value which is required to provide zero voltage switching for the AC generator.

6) The use of the current combiner 20 in place of traditional separate inductors provides less ac current through the filtering elements, less energy losses, and faster transient response.

Pulse Resonant Gate Driver:

It is in the nature of high frequency switches such as Field Effect Transistors (FET) that they have a large input capacitance. At high frequencies of operation the power lost in the process of charge-discharge of the gate capacitance can be substantial. As disclosed in the aforementioned co-pending applications, Ser. No. 09/534,641 entitled "High Frequency Switch-mode DC Powered Computer System" and Ser. No. 09/584,412 entitled "System for Controlling the Delivery of Power to DC Computer Components", resonating of the gate network capacitance was proposed in order to minimize gate drive losses. In such a system the gate voltage is substantially sinusoidal. The disadvantage of sinusoidal drive voltages is that there is a much longer switching time of the switch compared to traditional square wave drive voltages that can cause additional dynamic losses. Increasing the amplitude of sinusoidal gate voltage can decrease switching time but because of the non-zero gate resistance the gate drive losses proportionally increase. Moreover there is a gate voltage breakdown limit that restricts the maximum gate voltage that can be utilized.

Figure 8:
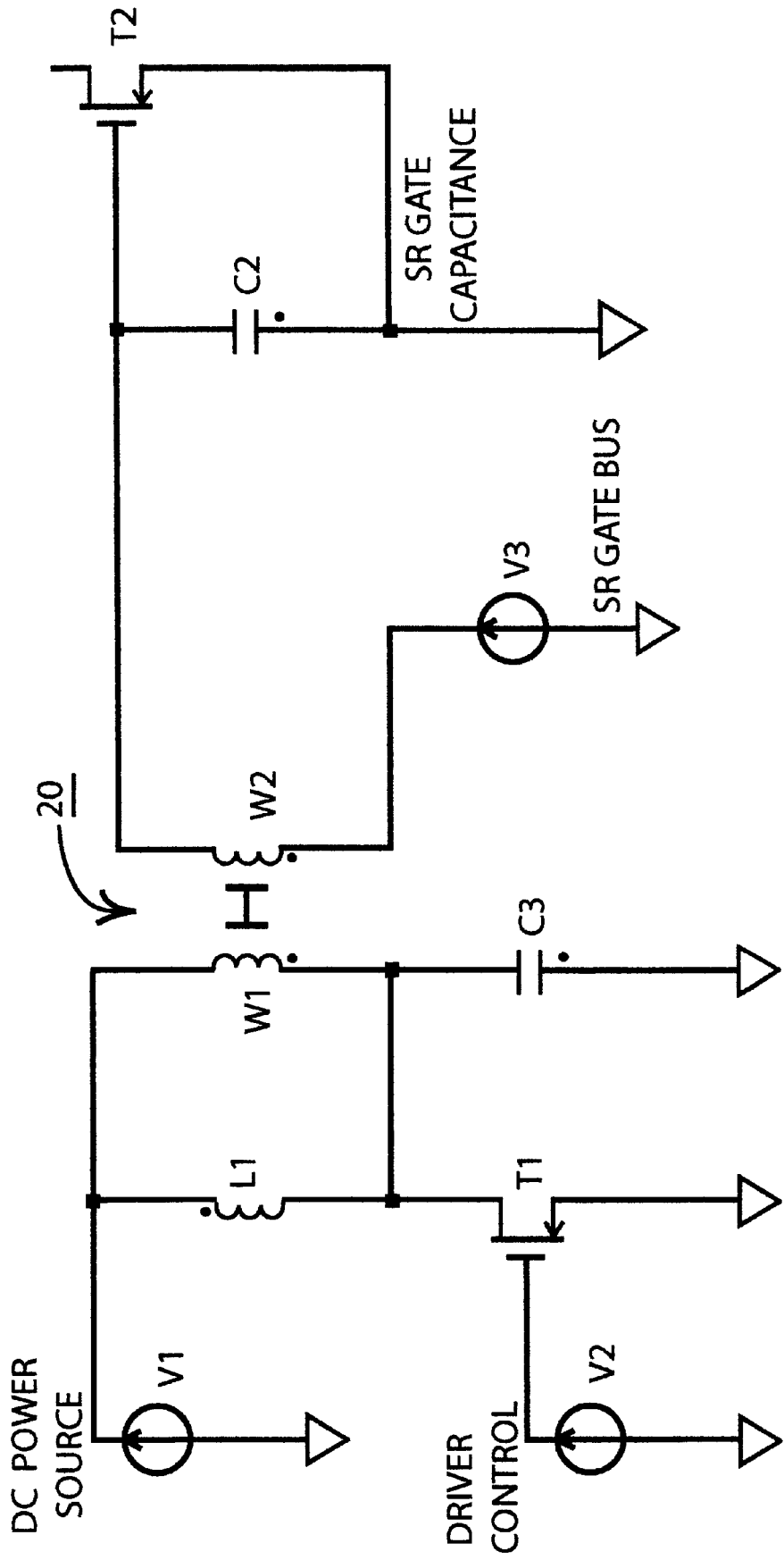
FIG. 8 illustrates a pulse resonant gate driver for the synchronous rectifier.
Figure 9:
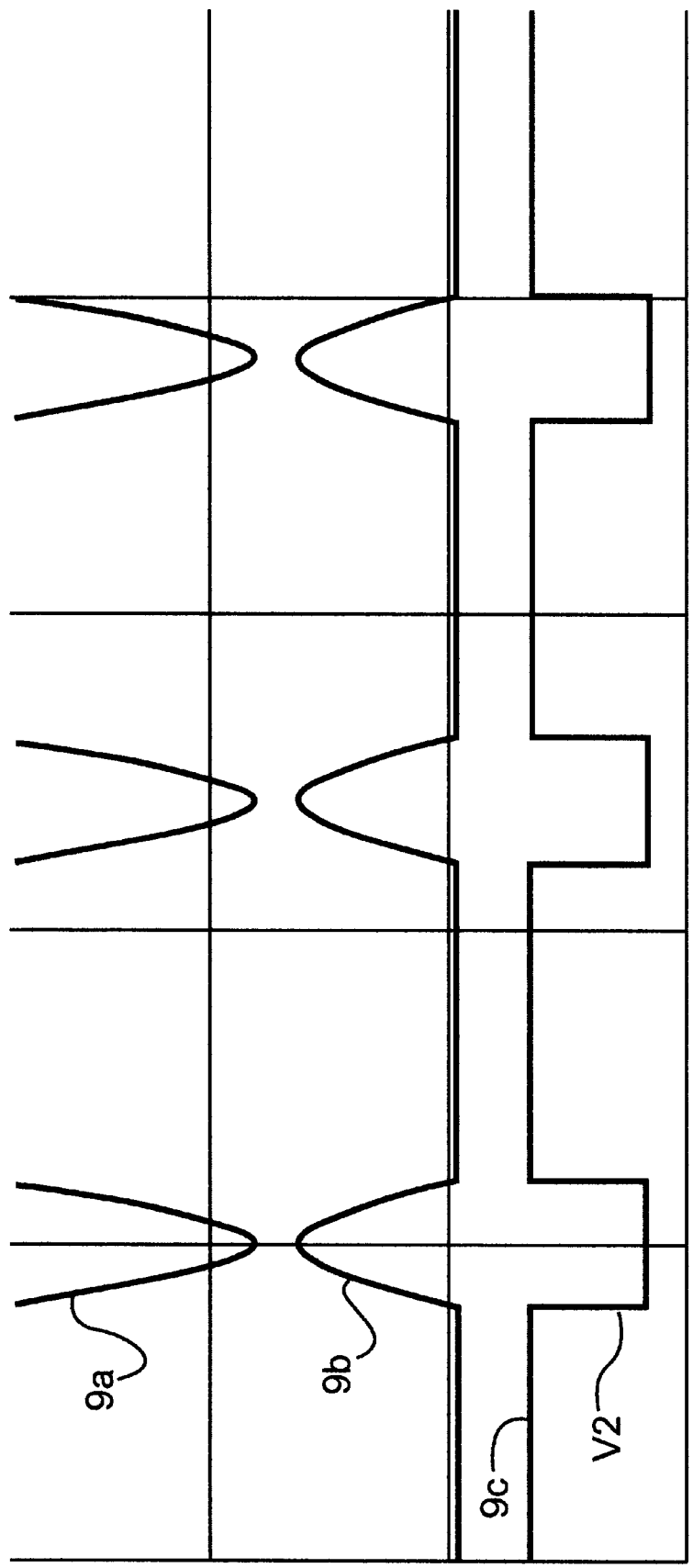
FIG. 9 illustrates the voltage for the pulse resonant gate driver shown in FIG. 8.

In the present invention this conflict is avoided by utilizing the gate capacitance of switch T2 as the circuit capacitance of the low loss switch mode resonant generator, which is used as a gate driver in FIG. 8. Referring to FIGS. 8 and 9, FIG. 8 shows one of the realizations of the principle described. The network comprised of transistor T1 with inductor L1 and capacitor C3 represents well-known configurations of prior art switched mode AC generator operating in highly efficient E class. The external square wave generator V2 ("Driver Control") drives transistor T1. The voltage waveform for the driver control V2 is illustrated in FIG. 9c for the T1 gate voltage. This type of generator forms half-sinusoidal pulses at the drain of T1 in the zero voltage switching mode that is represented by the waveform shown in FIG. 9b. The input capacitance of the FET T2 represented in FIG. 8 as an external to T2 capacitor C2 is connected to the AC generator through the isolating transformer 22. This way C2 becomes actually a part of the resonance circuit L1–C3. The transformer 22 in this configuration is used in three ways. It inverts polarity of the output voltage of the AC generator, isolates the AC generator-driver from the circuit to be driven, and matches the output voltage of the AC generator to required input voltage on the gate of FET T2. FIG. 9a shows the voltage at the gate of the FET T2. As it is seen from FIG. 9c the slopes of the fronts of the switching voltage for given peak-to-peak amplitude is much steeper than that which could be obtained utilizing a sinusoidal drive. The gate bias V3 for the synchronous rectifier is needed in order to provide a positive voltage offset at the gate of the FET T2.

Figure 10:
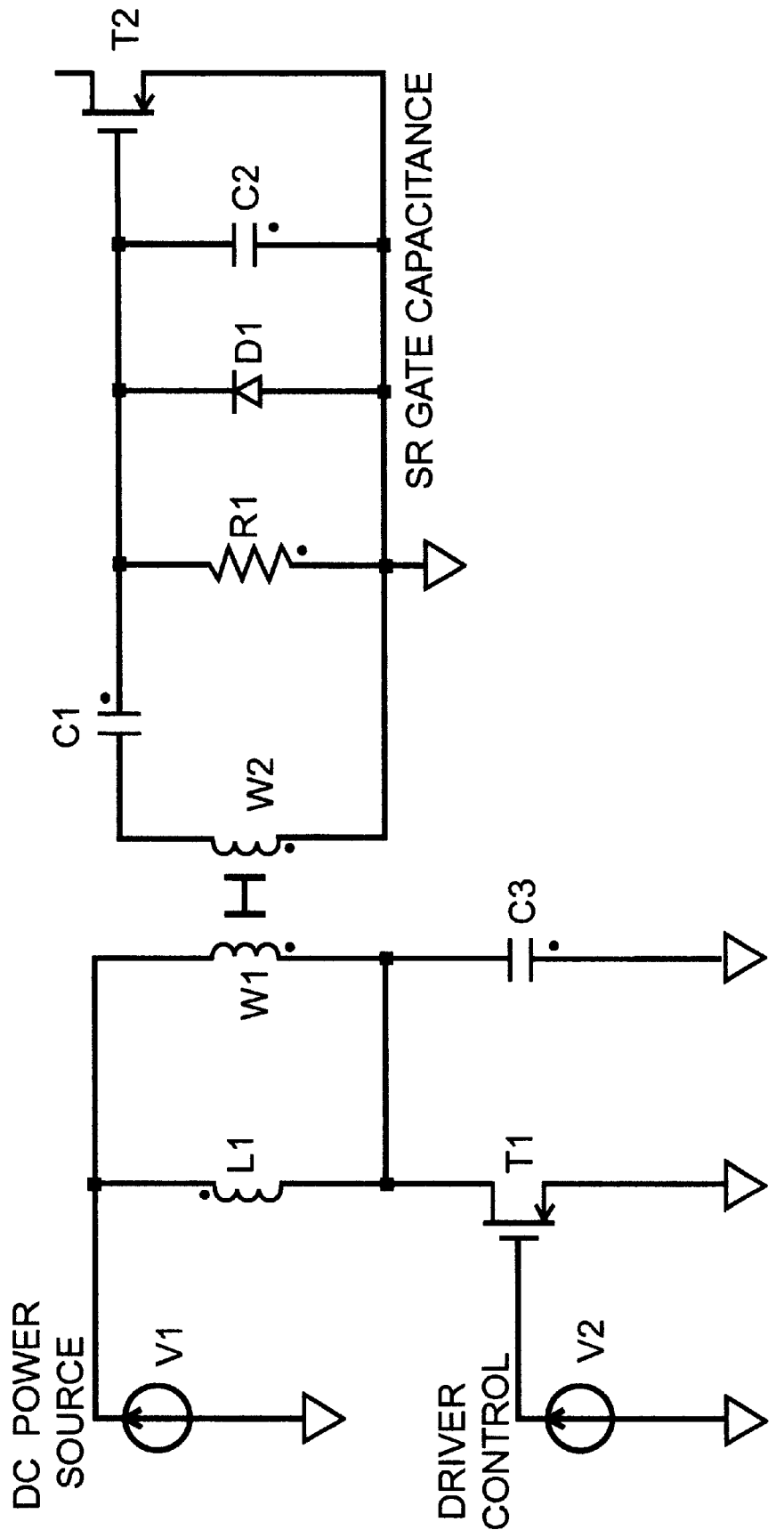
FIG. 10 illustrates a pulse resonant driver similar to that shown in FIG. 8 that utilizes a rectifier circuit for the gate biasing source instead of an external voltage source.

FIG. 10 shows an optional configuration of the same basic topology as that in FIG. 8 but instead of using external source V3 for the gate biasing there is a rectifier circuit added comprised of elements C1, R1 and D1. Those elements form a peak detector, which uses the gate drive voltage to create the gate bias for T2. Such a configuration automatically provides optimal bias when amplitude of the drive signal changes for some reason.

There is the way to further improvement of the shape of the gate drive voltage so that it is a closer approximation to the ideal square-wave shape. It is based on mathematical abstract of the square-wave pulse as a sum of sinusoidal harmonics with certain phase and amplitude ratio. So if a certain amount of energy at the upper harmonics is injected into the network described above in FIG. 8 it is possible to form steeper slopes for the gate drive pulse. These upper harmonics can be generated externally by using a circuit similar to that shown in FIG. 8 for an efficient switch mode generator. Actually the driver shown in FIG. 8 generates quite a broad spectrum of upper harmonics. The required harmonic can be filtered out from the spectrum and added to the basic signal.

Figure 11:
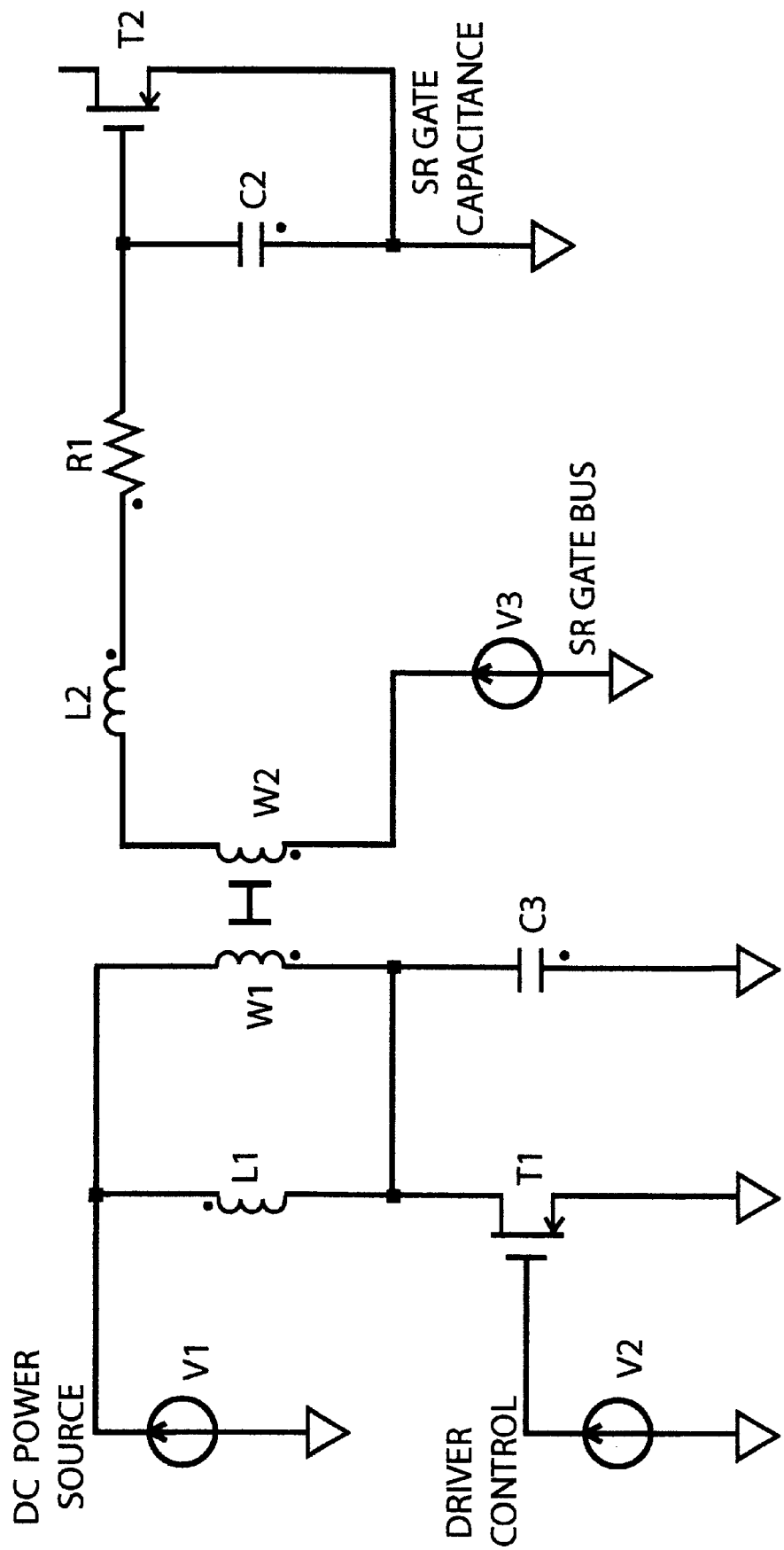
FIG. 11 illustrates a pulse resonant driver that utilizes upper harmonics to approximate an ideal square-wave shape for the gate voltage.
Figure 12:
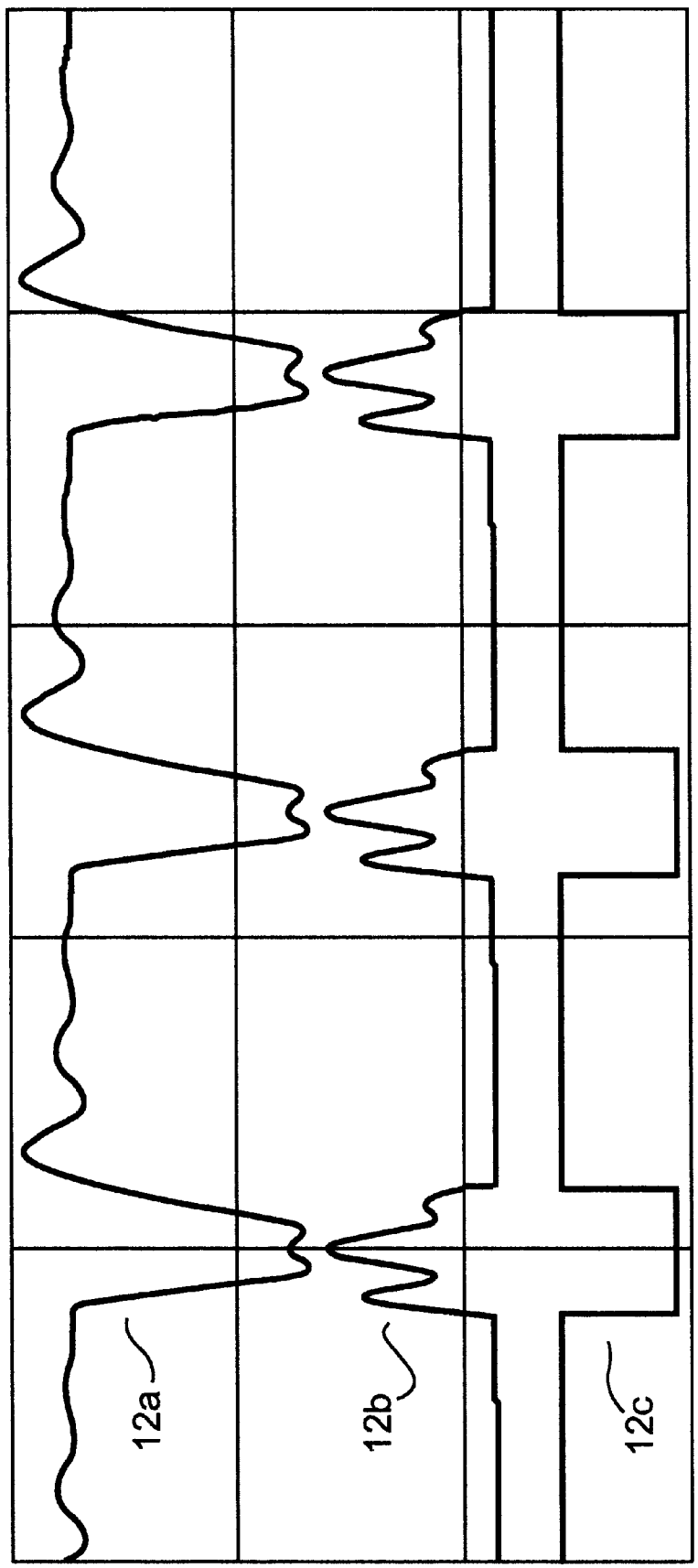
FIG. 12 illustrates the voltage waveforms for the pulse resonant gate driver shown in FIG. 11.

FIG. 11 shows one of the possible configurations of such a driver. There is only one difference between FIGS. 8 and 11 and that is the additional inductor L2 and resistor R1. L2 is tuned in resonance with the capacitor C2 at the required upper harmonic frequency. Resistor R1 is required to control the upper harmonic amplitude. FIGS. 12a, 12b, and 12c illustrate the waveforms for the gate driver voltage V3. FIG. 12a is the voltage at the gate of T2, FIG. 12b is the voltage at the drain of T1, and FIG. 12c is the drive voltage at the gate of T1. Oscillations on the top of FIG. 12a, which is the gate drive voltage for T2 practically does not change the mode of operation because the top part of that signal shown in FIG. 12a corresponds to the ON state of the FET when it is in the deep saturation mode. Switching of T2 and corresponding switching losses take place near the bottom part of that waveform where the slopes of the pulse are steeper than that those shown in FIG. 9 for the driver of FIG. 8 without the harmonic control.

Elements L2, R1 and C2 may not be actual components in the circuit, but rather simply a circuit representation of parts of the real transformer leakage inductance, real transistor gate resistance and real transistor input capacitance. It should be noted that, should the natural values of the leakage inductance, the gate resistance and the gate capacitance were smaller than desirable for any reason, additional real elements may be added, as will be understood by those skilled in the art.

It can be readily seen that there is provided a novel that operates at higher frequencies and controls the output power by changing the phase of commutation of the synchronous rectifier in reference to that of the AC generator. Although there is illustrated and described specific structure and details of operation, it is clearly understood that the same were merely for purposes of illustration and that changes and modifications may be readily made therein by those skilled in the art without departing from the spirit and the scope of this invention.

I claim:

1. A DC-DC switch mode power converter, comprising:
    a) an input rectifier for converting ac input power into dc input power;
    b) an ac generator connected to the output of the input rectifier for converting the dc input power into an ac power output at a predetermined frequency;
    c) a synchronous rectifier connected to the output the ac generator for converting the ac power into a dc power output;
    d) a variable phase shifter connected to the output of the ac generator and a switch of the synchronous rectifier to change the phase of the synchronous rectifier in reference to the ac generator wherein the output power of the synchronous rectifier is controlled; and e) filtering elements connected to the output of the synchronous rectifier to supply dc power to a load.

2. A DC-DC switch mode power converter as recited in claim 1 wherein the variable phase shifter is a time delay circuit.

3. A DC-DC switch mode power converter as recited in claim 2 wherein the load is a computer component.

4. A DC-DC switch mode power converter, comprising:

a) an input rectifier for converting ac input power into dc input power;

b) an ac generator connected to the output of the input rectifier for converting the dc input power into an ac power output at a predetermined frequency;

c) a transformer having a primary connected to the output of the ac generator and a secondary connected to a synchronous rectifier;

d) the synchronous rectifier is coupled by the transformer to the ac generator for converting the ac power into a dc power output;

e) a variable phase shifter connected to the output of the ac generator and a switch of the synchronous rectifier to change the phase of the synchronous rectifier in reference to the ac generator wherein the output power of the synchronous rectifier is controlled;

f) a current combiner connected to the output of the synchronous rectifier to supply dc power to a load.

5. A DC-DC switch mode power converter as recited in claim 4 wherein the variable phase shifter is a time delay circuit.

6. A DC-DC switch mode power converter as recited in claim 5 wherein the load is a computer component.

7. A DC-DC switch mode power converter as recited in claim 6 wherein the transformer isolates the AC generator from the synchronous rectifier.

8. A DC-DC switch mode power converter as recited in claim 7 wherein the transformer matches the input and output voltages.

9. A DC-DC switch mode power converter as recited in claim 8 wherein the leakage inductance of the transformer can be part of the energy storage inductance.

10. A DC-DC switch mode power converter as recited in claim 9 wherein the leakage inductance of the transformer is the only storage inductance.

11. A DC-DC switch mode power converter, comprising:

a) an input rectifier for converting ac input power into dc input power;

b) an ac generator connected to the output of the input rectifier for converting the dc input power into an ac power output at a predetermined frequency;

c) a transformer having a primary connected to the output of the ac generator and a secondary connected to a synchronous rectifier;

d) the synchronous rectifier is coupled by the transformer to the ac generator for converting the ac power into a dc power output;

e) a gate driving ac generator connected to the switches of the synchronous rectifier wherein the switch input capacitance acts as the circuit capacitance of the ac generator;

f) a variable phase shifter connected to the output of the ac generator and a switch of the synchronous rectifier to change the phase of the synchronous rectifier in reference to the ac generator wherein the output power of the synchronous rectifier is controlled; and g) filtering elements connected to the output of the synchronous rectifier to supply dc power to a load.

12. A DC-DC switch mode power converter as recited in claim 11 wherein the variable phase shifter is a time delay circuit.

13. A DC-DC switch mode power converter as recited in claim 12 wherein the load is a computer component.

14. A DC-DC switch mode power converter as recited in claim 13 wherein the transformer isolates the AC generator from the synchronous rectifier.

15. A DC-DC switch mode power converter as recited in claim 14 wherein the transformer matches the input and output voltages.

16. A DC-DC switch mode power converter as recited in claim 15 wherein the leakage inductance of the transformer can be part of the energy storage inductance.

17. A DC-DC switch mode power converter as recited in claim 16 wherein the leakage inductance of the transformer is the only storage inductance.

18. A DC-DC switch mode power converter, comprising:

a) an input rectifier for converting ac input power into dc input power;

b) an ac generator connected to the output of the input rectifier for converting the dc input power into an ac power output at a predetermined frequency;

c) a transformer having a primary connected to the output of the ac generator and a secondary connected to a synchronous rectifier;

d) the synchronous rectifier is coupled by the transformer to the ac generator for converting the ac power into a dc power output;

d) a variable phase shifter connected to the output of the ac generator and a switch of the synchronous rectifier to change the phase of the synchronous rectifier in reference to the ac generator wherein the output power of the synchronous rectifier is controlled;

e) a rectifier circuit connected to a switch of the synchronous rectifier wherein the rectifier circuit acts as a peak detector that utilizes the gate drive voltage as the bias voltage for the synchronous switch; and f) filtering elements connected to the output of the synchronous rectifier to supply dc power to a load.

19. A DC-DC switch mode power converter as recited in claim 18 wherein the variable phase shifter is a time delay circuit.

20. A DC-DC switch mode power converter as recited in claim 19 wherein the load is a computer component.

21. A DC-DC switch mode power converter as recited in claim 20 wherein the transformer isolates the AC generator from the synchronous rectifier.

22. A DC-DC switch mode power converter as recited in claim 21 wherein the transformer matches the input and output voltages.

23. A DC-DC switch mode power converter as recited in claim 22 wherein the leakage inductance of the transformer can be part of the energy storage inductance.

24. A DC-DC switch mode power converter as recited in claim 23 wherein the leakage inductance of the transformer is the only storage inductance.

25. A DC-DC switch mode power converter, comprising:

a) an input rectifier for converting ac input power into dc input power;

b) an ac generator connected to the output of the input rectifier for converting the dc input power into an ac power output at a predetermined frequency;

c) a transformer having a primary connected to the output of the ac generator and a secondary connected to a synchronous rectifier;
d) the synchronous rectifier is coupled by the transformer to the ac generator for converting the ac power into a dc power output;
e) a gate driving ac generator connected to the switches of the synchronous rectifier wherein the switch input capacitance acts as the circuit capacitance of the ac generator;
f) an inductance and resistance connected in series with the gate of the switches of the synchronous rectifier to tune the switch input capacitance to the upper harmonics of the gate driving voltage;
g) a variable phase shifter connected to the output of the ac generator and a switch of the synchronous rectifier to change the phase of the synchronous rectifier in reference to the ac generator wherein the output power of the synchronous rectifier is controlled; and
h) filtering elements connected to the output of the synchronous rectifier to supply dc power to a load.

26. A DC-DC switch mode power converter as recited in claim 25 wherein the resistance controls the amplitude of the upper harmonic gate driving voltage.

27. A DC-DC switch mode power converter as recited in claim 26 wherein the variable phase shifter is a time delay circuit.

28. A DC-DC switch mode power converter as recited in claim 27 wherein the load is a computer component.

29. A DC-DC switch mode power converter as recited in claim 28 wherein the transformer isolates the AC generator from the synchronous rectifier.

30. A DC-DC switch mode power converter as recited in claim 29 wherein the transformer matches the input and output voltages.

31. A DC-DC switch mode power converter as recited in claim 30 wherein the leakage inductance of the transformer can be part of the energy storage inductance.

32. A DC-DC switch mode power converter as recited in claim 31 wherein the leakage inductance of the transformer is the only storage inductance.

* * * * *